United States Patent
Brucken

[11] 3,735,847
[45] May 29, 1973

[54] ELECTROMAGNETIC SPRING-WOUND CLUTCH

[75] Inventor: Byron L. Brucken, Dayton, Ohio

[73] Assignee: General Motors Corporation, Detroit, Mich.

[22] Filed: Mar. 20, 1972

[21] Appl. No.: 236,022

[52] U.S. Cl. .................192/35, 192/81 C, 192/84 T, 192/106.1
[51] Int. Cl........F16d 27/10, F16d 41/20, F16d 3/12
[58] Field of Search ....................192/35, 81 C, 84 C, 192/84 T, 106.1

[56] References Cited
UNITED STATES PATENTS

| | | | |
|---|---|---|---|
| 3,349,880 | 10/1967 | Baer | 192/84 T |
| 3,149,706 | 9/1964 | Mason et al. | 192/84 C X |
| 3,685,622 | 8/1972 | Baer | 192/81 C X |
| 3,637,056 | 1/1972 | Baer | 192/35 X |
| 3,149,705 | 9/1964 | Shoquist | 192/84 C X |

Primary Examiner—Allan D. Herrmann
Attorney—Warren E. Finken, A. M. Heiter and John P. Moran

[57] ABSTRACT

The drawings illustrate an electromagnetic spring-wound clutch wherein an input pulley hub member is axially aligned with an output shaft hub member, and both are surrounded by a coil-wound spring having one end thereof secured to the output shaft hub member. A flanged clutch armature ring is mounted around and adjacent the other end of the spring, with a bent-end tab of the spring extending through a slot formed in the armature ring. When the armature ring is drawn into frictional contact with a radial wall formed on the input pulley hub member by an adjacent energized electromagnetic coil, the bent tab is caused to rotate with the armature ring, in turn, causing the spring to wrap around and grippingly engage the pulley hub member to thus drive the output shaft hub member, the flux path being from the coil housing across a first air gap to the radial pulley wall and, as a result of a circumferential slot formed in the radial wall, across a second variable air gap into the armature ring around the circumferential slot and back to the radial wall and, thence, back across the first air gap to the coil housing.

8 Claims, 4 Drawing Figures

PATENTED MAY 29 1973 3,735,847

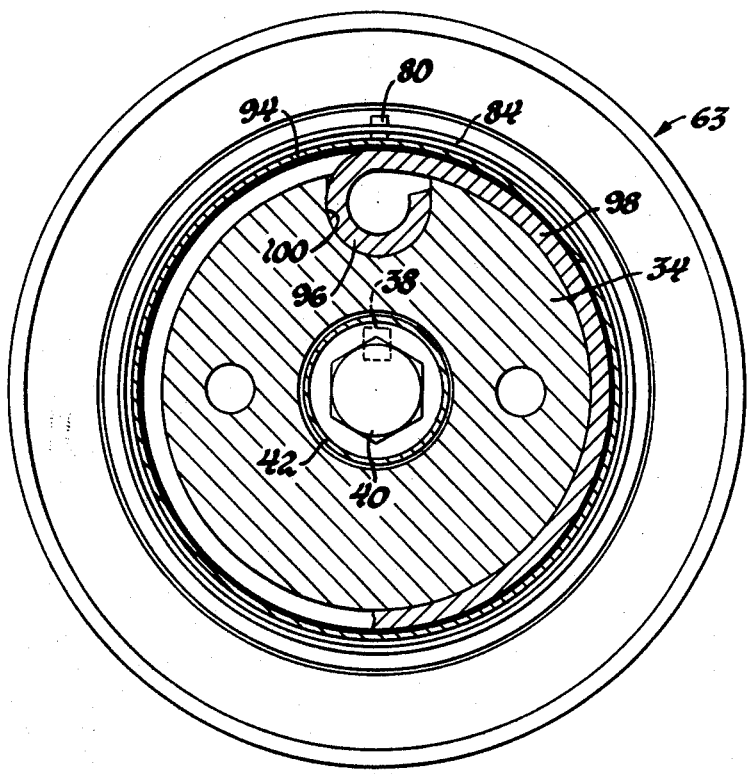
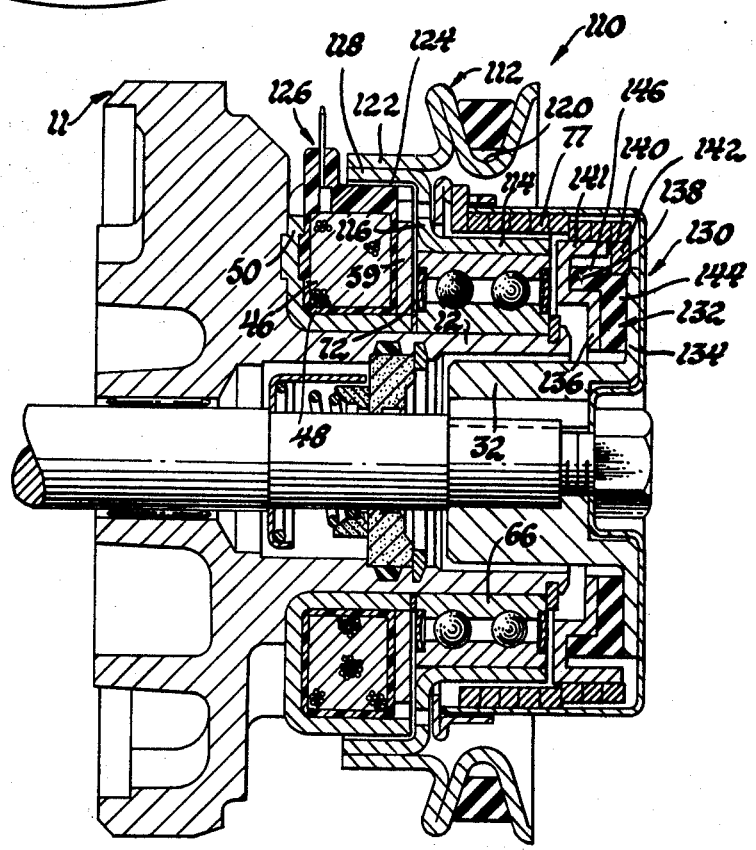

ELECTROMAGNETIC SPRING-WOUND CLUTCH

The invention relates generally to clutches and, more particularly, to electromagnetic spring-wound clutches.

A general object of the invention is to provide an improved electromagnetic and wrap-spring clutch arrangement.

Another object of the invention is to provide an improved electromagnetic spring-wound clutch wherein the coil housing, input pulley, armature and coil-wound spring are compactly arranged for highly efficient actuation of an output shaft for driving an accessory device, such as an automotive air compressor.

A further object of the invention is to provide an electromagnetic spring-wound clutch wherein a suitably slotted radial wall portion of the pulley assembly serves as a magnetic pole member intermediate the coil housing and an armature member, the latter being slidably, yet drivably associated with the wound-spring.

These and other objects and advantages of the invention will be apparent when reference is made to the following description and accompanying drawings, wherein:

FIG. 3 is a cross-sectional view taken along the plane of line 3—3 of FIG. 1, as if FIG. 1 were a full-round view, and looking in the direction of the arrows; and FIG. 4 is a cross-sectional view of an alternate embodiment of a portion of the FIG. 1 structure.

Figure 1:
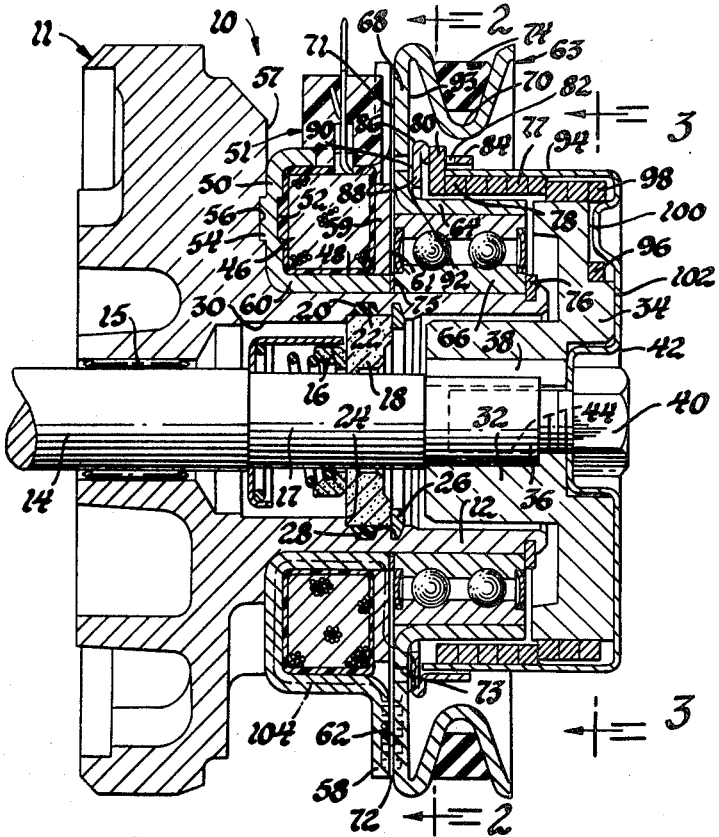
FIG. 1 is a cross-sectional view illustrating an electromagnetic clutch embodying the invention.
Figure 2:
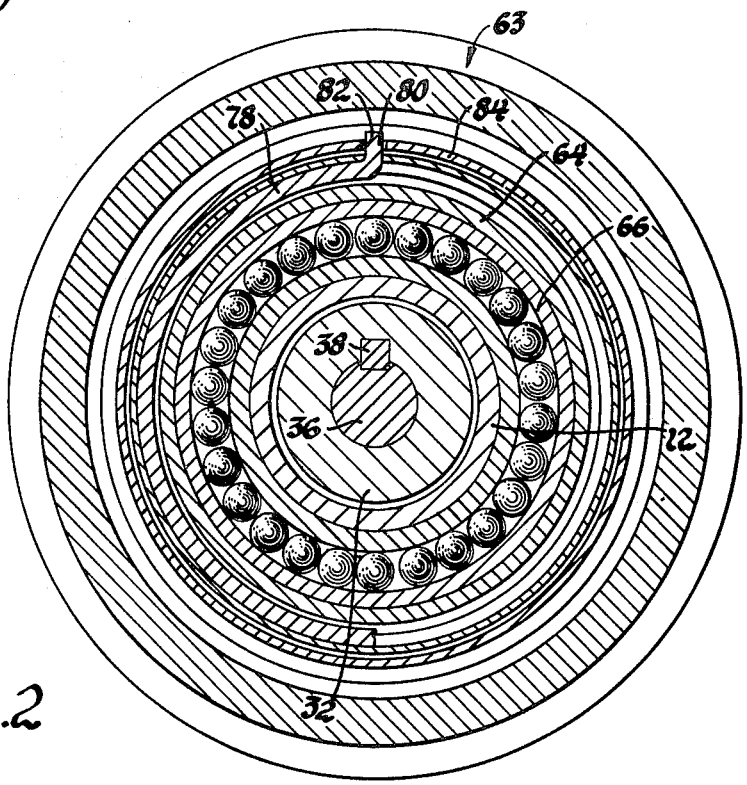
FIG. 2 is a cross-sectional view taken along the plane of line 2—2 of FIG. 1, as if FIG. 1 were a full-round view, and looking in the direction of the arrows.

Referring now to the drawings in greater detail, FIG. 1 illustrates an electromagnetic spring-wound clutch 10 suitable for driving an air-conditioning compressor 11, on the forward end of which is formed a tubular extension 12. An output shaft 14 for driving the compressor 11 is rotatably mounted on needle bearings 15, extending outwardly through the tubular extension 12. A rotating shaft seal 16 is mounted around a reduced intermediate portion 17 of the shaft 14. The shaft seal 16 is in sealing engagement with a stationary seal ring 18, the latter being sealed to the tubular extension 12 by an O-ring-type seal ring 20 mounted in a groove 22 formed in the tubular extension 12. The seal ring 18 is confined axially between a shoulder 24 formed within the tubular extension 12 and a split locking ring 26 mounted in a groove 28 formed in the tubular extension 12. The inner bore of the tubular extension 12 is enlarged at 30 to facilitate assembly and removal of the locking ring 26, the stationary seal ring 18, and the rotating part of the shaft seal 16.

The enlarged inner bore 30 of the tubular extension 12 also provides space for the accommodation of the greater portion of a hub 32 of a driven member 34, the hub 32 being mounted upon a reduced end portion 36 of the shaft 14. The hub 32 is keyed to the output shaft 14 by a suitable key 38 and is held on the end portion 36 of the shaft 14 by a bolt 40 mounted through central openings formed in a retaining cap 42 and in the hub 32 and threadedly inserted in a threaded opening 44 formed in the reduced shaft end 36.

An annular electromagnetic coil 46 consisting of a predetermined number of turns is mounted around the tubular extension 12. The coil 46 is embedded within a suitable resin 48, such as epoxy or nylon or polyester resin, the assembly being mounted in an annular coil housing 50. A terminal assembly 51 is formed on the coil-resin assembly 46/48 and extended outwardly through a cut-out portion of the housing 50 as a means for energizing the coil 46.

The coil housing 50 is formed of paramagnetic material, such as steel or malleable iron, and is provided with a plurality of locking recesses 52 into which the resin 48 is cast. In addition, the coil housing 50 is provided with a plurality of integral projections 54 which extend within respective recesses 56 formed in the adjacent forward wall 57 of the compressor 11. A radially outwardly extending flange or collar 58 is formed on the outer right corner (FIG. 1) of the coil housing 50. A wall member 59 is secured to the inner cylindrical wall 60 of the coil housing 50 in any suitable manner, such as by being press-fitted thereon to form a fourth wall around the coil 46. The outer surface 61 of the wall member 59 is radially aligned with a face 62 of the outwardly extending flange 58.

A pulley assembly 63 includes a hub 64 mounted on bearings 66 around the tubular extension 12, a radially extending wall 68 formed on the hub 64, and a pulley groove 70 formed on the outer end of the wall 68 radially aligned with the hub 64. The location of the outer surface 71 of the radial wall 68 is such that a radial air gap or space 72 of a predetermined width exists between the outer surface 71 and the adjacent aligned surfaces 61 and 62 of the respective wall member 59 and radial flange 58 of the coil housing 50. A plurality of circumferentially aligned arcuate slots 73 are formed through the radial wall 68 at an intermediate location thereon. An engine-driven belt 74 is mounted in the pulley groove 70. The bearings 66 are axially confined between a washer-like bearing spacer 75 and a retainer ring 76 mounted in a groove formed adjacent the end of the tubular extension 12.

A coil-wound spring 77 is mounted around the pulley hub 64 and the radial outer surface of the driven member 34. The innermost loop 78 of the spring 77 has a bent-end tab 80 formed thereon, extending outwardly through an opening 82 formed in a cylindrical portion 84 of a clutch armature ring 86. The ring 86 further includes a radial flanged portion 88 whose outer face 90 is mounted a predetermined air gap or space 92 width apart from the adjacent surface 93 of the radial pulley wall 68.

The spring 77 is confined within a cylindrical wall 94 of the retaining cap 42 and, in its free state, is spaced radially apart from the pulley hub 64 over substantially the left half (FIG. 1) of its length. The right half of the spring 77 is spaced radially apart from the cylindrical wall 94, being secured to the driven member 34 by virtue of a ring 96 (FIG. 3) formed on the outermost loop 98 of the spring 77 and mounted in a pocket or recessed portion 100 formed in the face 102 of the driven member 34. The cylindrical portion 84 of the armature ring 86 is slidably mounted around the cylindrical wall 94 of the retaining cap 42.

OPERATION

In operation, the clutch 10 is engaged by the energization of the electromagnetic coil 46 via the terminal 51 assembly which causes magnetic flux to traverse a path through the adjacent paramagnetic materials, as indicated by the dot-dash line 104 (FIG. 1). More specifically, the path of the flux is primarily from the coil 46 to the surrounding walls of the coil housing 50 to the radial flange 58 formed on the coil housing 50, thence across the radial gap 72 into the radial wall 68 of the pulley assembly 63 outward of the arcuate slots 73.

The flux next crosses the radial gap 92 outwardly of the arcuate slots 73 from the radial wall 68 to enter the armature ring 86, from whence it once again crosses the radially extending gap 92 to the radial pulley wall 68 of the pulley assembly 63, inwardly of the arcuate slots 73. Then, the flux crosses the gap 72 to the coil housing wall member 59 to complete the circuit to the inner cylindrical wall 60 of the coil housing 50.

This arrangement provides a strong, four-pole magnetic clutch field which attracts the armature ring 86, effecting a face-to-face engagement with the radial wall 68 of the pulley assembly 63. Once this occurs, the left half (FIG. 1) of the coil-wound spring 77 is wound into gripping contact around the rotating hub 64 of the pulley assembly 63. Since the right half (FIG. 1) of the spring 77 is secured to the driven member 34 by virtue of the ring 96 being inserted in the pocket 100 formed in the driven member 34, the member 34 will thus be caused to rotate, in turn, driving the hub 32, the output shaft 14, and the compressor 11.

When the coil 46 is deenergized, nulling the magnetic attraction across the gaps 72 and 92, the armature ring 86 will be released from the radial pulley wall 68, thereby releasing the bent-end tab 80 of the spring 77 and thus permitting the latter to unwind from the pulley hub 64, thereby breaking the connection between the input pulley assembly 63 and the output shaft 14.

FIG. 4 EMBODIMENT

FIG. 4 illustrates an electromagnetic spring-wound clutch 110 which is generally similar to the clutch 10 of FIG. 1, and those elements which are common to both embodiments bear the same reference numerals.

A pulley assembly 112 includes a hub 114 mounted on the bearings 66 around the tubular extension 12, a radially extending wall 116 formed on the hub 114 and having a first cylindrical flange 118 formed thereon and a pulley groove 120 formed on a second cylindrical flange 122 secured to the first cylindrical flange 118 in any suitable manner. The pulley groove 120 is formed so as to be radially aligned with the hub 114. The cylindrical flange 118 extends past a portion of the coil housing 50, spaced a predetermined air gap or space 124 apart therefrom. As in the FIG. 1 arrangement, the air gap 72 exists between the radial wall 116 and the wall member 59 of the coil housing 50. A terminal assembly 126 is formed on the coil-resin assembly 46/48 and extended outwardly through a cut-out portion of the coil housing 50, to the left (FIG. 4) of the ends of the flanges 118 and 122.

The operation of the clutch 110 is similar to that of the clutch 10 of FIG. 1, except that the flux path resulting from the energization of the coil 46 traverses from the coil housing 50 both radially outwardly across the air gap 124 to the cylindrical flange 118 and axially across the air gap 72 to the radial pulley wall 116. A driven unit 130 associated with the output shaft hub 32 may be used in place of the driven member 34 of the FIG. 1 structure to accommodate the inclusion of a torque-cushion 132. The torque-cushion 132 is bonded between a radial flange 134 formed on the output hub 32 and a plate member 136 having an annular recessed portion 138 formed on the outer periphery thereof. A radial slot 140 is formed in an outer annular wall 141 of the recessed portion 138. A tang 142, formed on an end of the coil-wound spring 77, is mounted in the radial slot 140. The torque-cushion 132 includes a disc portion 144 confined between the radial flange 134 and the plate member 136, and a cylindrical flanged portion 146 mounted in the recessed poriton 138 radially adjacent the plate member 136.

In operation, once the armature ring 86 is drawn into contact with the radial wall 116 by the energized coil 46, and the spring 77 is thus brought into gripping engagement with the pulley hub 114, the plate member 136, the torque-cushion 132, and radial flange 134 are caused to rotate, driving the output shaft 14 via the hub 32, with the torque-cushion 132 serving to absorb torque pulses and to diminish operational noise.

It should be apparent that the inventon provides a simplified, compact and efficient electromagnetic spring-wound clutch wherein the input pulley includes a suitably slotted magnetic pole portion mounted intermediate the coil housing and an armature ring member associated with the coil-wound spring, a predetermined air space apart from each, providing an improved four-pole magnetic clutch field arrangement.

While but one principal embodiment of the invention has been shown and described, other modifications thereof are possible.

I claim:

1. An electromagnetic spring-wound clutch comprising driving and driven members axially aligned for relative rotation about a common axis, a stationary coil housing, an electromagnetic coil mounted in said coil housing, a coil-wound spring mounted around said driving and driven members and having one end thereof secured to said driven member, an armature member operatively connected to the other end of said coil-wound spring for rotation therewith and axial movement thereon, and a radially extending pole member formed on said driving member intermediate said armature member and said coil housing, said coil when energized drawing said armature member axially into frictional contact with said pole member without axially moving said other end of said coil-wound spring while causing said spring to frictionally engage said driving member to thereby drive said driven member.

2. An electromagnetic spring-wound clutch comprising input and output members axially aligned for relative rotation about a common axis, a stationary coil housing, an electromagnetic coil mounted in said coil housing, a coil-wound spring mounted around said input and output members and having one end thereof secured to said output member, an armature member mounted around the other end of said coil-wound spring so as to be rotatable therewith and axially movable relative thereto, a radially extending pole member formed on said input member intermediate said armature member and said coil housing, the magnetic clutch field produced by said coil when energized serving to axially move said armature member into frictional contact with said pole member without axially distorting or moving any portion of said coil-wound spring while circumferentially restraining said other end of said spring and causing said spring to grippingly engage said input member to thereby drive said output member.

3. An electromagnetic spring-wound clutch comprising driving and driven members axially aligned for relative rotation about a common axis, a stationary coil housing, an electromagnetic coil mounted in said coil housing, a coil-wound spring mounted around said driving and driven members and having one end thereof secured to said driven member and an outwardly extending tab formed on the other end thereof, an armature ring member including a cylindrical portion and a radial flange portion, an opening formed in said cylindrical portion for the insertion therethrough of said outwardly extending tab, and a radially extending pole member formed on said driving member intermediate said radial flange portion of said armature ring member and said coil housing respective predetermined air spaces apart therefrom, said coil when energized drawing said armature ring member axially through one of said air spaces into frictional contact with said pole member without axially moving said other end of said coil-wound spring while contacting said tab and thereby causing said spring to frictionally engage said driving member to thereby drive said driven member.

4. The electromagnetic spring-wound clutch described in claim 3, and torque-cushion means operatively connected intermediate said driving and driven members.

5. An electromagnetic spring-wound clutch comprising an input pulley assembly including a hub member, a pulley groove portion and a radial pole member interconnecting said hub member and said pulley groove portion, a plurality of circumferentially aligned arcuate slots formed in said radial pole member, an output shaft, a hub member mounted on said output shaft axially aligned with said pulley hub member for relative rotation about a common axis, a stationary coil housing having a radial wall portion adjacent said radial pole member both radially outwardly and radially inwardly of said arcuate slots, an electromagnetic coil mounted in said coil housing, a coil-wound spring mounted around said input pulley hub member and said output shaft hub member and having one end thereof secured to said output shaft hub member, and an armature member including a cylindrical portion mounted around the other end of said coil-wound spring and movable axially relative thereto and a flange portion adjacent said other end, said radial pole member being located intermediate said flange portion of said armature member and said coil housing, a first predetermined air space intermediate said coil housing and said radial pole member, a second predetermined air space intermediate said radial pole member and said flange portion of said armature member, said coil when energized drawing said armature member axially through said second air space so as to close said second air space and bring said flange portion of said armature member into frictional contact with said radial pole member without axially moving said other end of said coil-wound spring while causing said spring to grippingly engage said pulley hub member to thereby drive said output hub member and said output shaft, the flux path being from said coil housing across said first air space to said pole member radially outwardly of said arcuate slots, thence across said closing second air space to said flange portion of said armature member and back across said closing second air space to said pole member radially inwardly of said arcuate slots, and across said first air space to said coil housing.

6. The electromagnetic spring-wound clutch described in claim 5, and a torque-cushion formed integrally with said output hub member.

7. The electromagnetic spring-wound clutch described in claim 6, wherein said torque-cushion is bonded on one side to a plate member and on the other side to a radial flange formed on said output hub member.

8. An electromagnetic spring-wound clutch comprising an input pulley assembly including a hub member, a pulley groove portion and a pole member interconnecting said hub member and said pulley groove portion, said pole member including a radial wall portion and a cylindrical wall portion, an output shaft, a hub member mounted on said output shaft axially aligned with said pulley hub member for relative rotation about a common axis, a stationary coil housing, said radial wall portion and said cylindrical wall portion each being located a predetermined air space apart from side and peripheral wall portions of said coil housing, an electromagnetic coil mounted in said coil housing, a coil-wound spring mounted around said input pulley hub member and said output shaft hub member and having one end thereof secured to said output shaft hub member, and an armature ring member mounted around the other end of said coil-wound spring so as to be rotatable therewith and movable axially relative thereto, said armature ring member being located a predetermined air space apart from said radial wall portion of said pole member, said coil when energized drawing said armature ring member axially through said last-mentioned air space into frictional contact with said radial wall portion of said pole member without axially moving said other end of said coil-wound spring while causing said spring to grippingly engage said pulley hub member to thereby drive said output hub member and said output shaft.

* * * * *